US011932436B2

(12) United States Patent
Wilson

(10) Patent No.: US 11,932,436 B2
(45) **Date of Patent: *Mar. 19, 2024**

(54) FLOWABLE FOOD FEEDING DEVICE

(71) Applicant: Kiley Steven Wilson, Paso Robles, CA (US)

(72) Inventor: Kiley Steven Wilson, Paso Robles, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/645,718

(22) Filed: Dec. 22, 2021

(65) Prior Publication Data

US 2022/0111991 A1 Apr. 14, 2022

Related U.S. Application Data

(63) Continuation of application No. 15/985,432, filed on May 21, 2018, now Pat. No. 11,235,900, which is a (Continued)

(51) Int. Cl.
*B65B 61/18* (2006.01)
*A61J 9/00* (2006.01)
(Continued)

(52) U.S. Cl.
CPC ............ *B65B 61/186* (2013.01); *A61J 9/005* (2013.01); *A61J 11/0085* (2013.01);
(Continued)

(58) Field of Classification Search
CPC .... B65B 61/186; B65B 3/045; A61J 15/0076; A61J 9/005; A61J 11/002
See application file for complete search history.

(56) References Cited

U.S. PATENT DOCUMENTS

| | | | |
|---|---|---|---|
| 811,801 | A | 2/1906 | Smith |
| 2,520,157 | A | 8/1950 | Little |

(Continued)

FOREIGN PATENT DOCUMENTS

| | | |
|---|---|---|
| DE | 202004014944 | 2/2005 |
| DE | 202012012139 | 1/2013 |
| WO | 2005004788 | 1/2005 |

OTHER PUBLICATIONS

Amazon.com, Squooshi 4 Count Reusable Food Pouch, Large Panda/Walrus, 4.5 Ounce, http://www.amazon.com/squooshireusable-pouch-large-walrus-4-count/dp/b00awjhcdw/ref=sr-1-1?ie=UTF8&qid=1384457479&sr-8-1&keywords=squooshi-count-reusable-pouch-walrus; Published as early as May 24, 2013.

(Continued)

*Primary Examiner* — Bradley J Osinski
(74) *Attorney, Agent, or Firm* — KOS IP Law LLP

(57) ABSTRACT

A container for feeding a patient includes a deformable receptacle having a cavity for holding a flowable food product and a rigid cover attachable to the upper end of the deformable receptacle. The rigid cover may have a male feeding tube connector that is uniquely connectable to a female feeding tube connector of a feeding tube or may have a female feeding tube connector that is uniquely connectable to a male feeding tube connector of a syringe. With the male and female feeding tube connectors connected, the deformable receptacle and the feeding tube or syringe are in fluid tight fluid communication to allow the flowable food product to be forced out of the opening of the deformable receptacle and into the feeding tube or syringe when the deformable receptacle is squeezed.

6 Claims, 10 Drawing Sheets

Related U.S. Application Data continuation-in-part of application No. 15/697,794, filed on Sep. 7, 2017, now Pat. No. 10,239,647, which is a continuation of application No. 14/685,441, filed on Apr. 13, 2015, now Pat. No. 9,789,988, which is a continuation-in-part of application No. 29/476,683, filed on Dec. 16, 2013, now Pat. No. Des. 730,533.

(60) Provisional application No. 62/607,740, filed on Dec. 19, 2017.

(51) Int. Cl.

| | |
|---|---|
| ***A61J 9/06*** | (2006.01) |
| ***A61J 11/00*** | (2006.01) |
| ***A61J 15/00*** | (2006.01) |
| ***B65B 3/04*** | (2006.01) |
| ***B65D 23/00*** | (2006.01) |
| ***B65D 47/08*** | (2006.01) |
| ***B65D 47/20*** | (2006.01) |
| ***B65D 51/18*** | (2006.01) |

(52) U.S. Cl.

CPC .......... *A61J 15/0076* (2015.05); *B65B 3/045* (2013.01); *B65D 47/0885* (2013.01); *B65D 47/2031* (2013.01); *B65D 51/18* (2013.01); *A61J 9/0646* (2015.05); *A61J 11/0015* (2013.01); *A61J 11/002* (2013.01); *A61J 2200/76* (2013.01); *B65D 23/003* (2013.01); *B65D 2251/0025* (2013.01); *B65D 2251/0087* (2013.01)

(56) References Cited

U.S. PATENT DOCUMENTS

| | | | |
|---|---|---|---|
| 2,743,044 | A | 4/1956 | Deemer |
| 2,804,995 | A | 9/1957 | Fee |
| 3,157,314 | A | 11/1964 | Nadler |
| 3,219,220 | A | 11/1965 | Hakim |
| 3,488,002 | A | 1/1970 | Mina |
| D223,438 | S | 4/1972 | Lluch |
| D240,968 | S | 8/1976 | Hurst |
| 4,376,762 | A | 3/1983 | Hauschild |
| 5,301,840 | A | 4/1994 | Sun |
| 5,339,995 | A | 8/1994 | Brown |
| 5,758,802 | A | 6/1998 | Wallays |
| D413,067 | S | 8/1999 | Haley |
| 5,992,662 | A | 11/1999 | Holt |
| 6,112,951 | A | 9/2000 | Mueller |
| 6,427,874 | B2 | 8/2002 | Brown |
| 6,575,204 | B1 | 6/2003 | Godfrey |
| 6,672,479 | B2 | 1/2004 | Shiraishi |
| 6,695,173 | B1 | 2/2004 | Fontana |
| 6,705,492 | B2 | 3/2004 | Lowry |
| 6,708,850 | B2 | 3/2004 | Uetake |
| 6,994,225 | B2 | 2/2006 | Hakim |
| 7,207,467 | B1 | 4/2007 | Raja |
| D602,369 | S | 10/2009 | Potts |
| D627,895 | S | 11/2010 | Pheil |
| D628,078 | S | 11/2010 | Valderrama |
| 7,959,036 | B2 | 6/2011 | Koh |
| D657,684 | S | 4/2012 | Venkataraman |
| D660,174 | S | 5/2012 | Schmertz, Jr. |
| 8,333,286 | B2 | 12/2012 | Spinelli |
| 8,602,237 | B2 | 12/2013 | Wurster |
| D705,072 | S | 5/2014 | Fedewa |
| D730,533 | S | 5/2015 | Wilson |
| 9,789,988 | B2 | 10/2017 | Wilson |
| 2002/0014499 | A1 | 2/2002 | Bonningue |
| 2004/0035815 | A1 | 2/2004 | Webb |
| 2005/0263475 | A1 | 12/2005 | Carlson |
| 2006/0226109 | A1 | 10/2006 | Ellegaard |
| 2006/0243756 | A1 | 11/2006 | Kawakita |
| 2006/0273059 | A1 | 12/2006 | Mendenhall |
| 2007/0029352 | A1 | 2/2007 | Norris |
| 2007/0056964 | A1 | 3/2007 | Holcomb |
| 2007/0114246 | A1 | 5/2007 | Awbrey |
| 2007/0272711 | A1 | 11/2007 | Macleod |
| 2007/0295354 | A1 | 12/2007 | Costa |
| 2009/0108009 | A1 | 4/2009 | Yeung |
| 2009/0242562 | A1 | 10/2009 | Valderrama |
| 2009/0321377 | A1 | 12/2009 | Pfenniger |
| 2010/0230373 | A1 | 9/2010 | Lo |
| 2010/0252578 | A1 | 10/2010 | Koh |
| 2011/0248051 | A1 | 10/2011 | Koh |
| 2011/0284491 | A1 | 11/2011 | Bryan |
| 2012/0043293 | A1 | 2/2012 | Bryan |
| 2012/0097710 | A1 | 4/2012 | Ahmer |
| 2012/0305582 | A1 | 12/2012 | Dunn |
| 2012/0315353 | A1 | 12/2012 | Becsi |
| 2013/0119008 | A1 | 5/2013 | Pfenniger |
| 2013/0306632 | A1 | 11/2013 | Dunn |
| 2014/0107608 | A1 | 4/2014 | McBean |
| 2015/0217911 | A1 | 8/2015 | Wilson |
| 2017/0361968 | A1 | 12/2017 | Wilson |

OTHER PUBLICATIONS

Amazon.com, Boon Squirt Baby Food Dispensing Spoon, http://www.amazon.com/Boon-Squirt-Dispensing-Spoon-Orange/dp/B000WEHO76/ref=sr-1-2?s=baby-products&ie=UTF8&qid=1384460473&sr=1-2&keywords=boon+squirt, Published as early as Nov. 14, 2013.

Amazon.com, Infantino Keeper Squeeze Pouch, http://www.amazon.com/Infantino-208-107-Keeper-Squeeze-Pouch/dp/B00B9ZHLRU/ref=sr-1-3?ie=UTF8&qid=1369177164&sr-8-3&keywords=Infantino+Squeeze, Published as early as May 23, 2013.

Amazon.com, Munchkin 4 Ounce Easy Squeezy Spoon, http://www.amazon.com/munchkin-ounce-squeezy-spoon-colors/dp/b004hmqpj2, Published as early as Nov. 14, 2013.

Beaba, Babypote, http://beabausa.com/products-categories/feeding/babypote/, Published as early as Nov. 14, 2013.

TheSiliCompany, Sili Squeeze, http://thesilico.com/products.html, Published as early as Nov. 14, 2013.

Enfant article, translation not available, Published as early as May 2004.

Best Baby article, translation not available, Published as early as May 2004.

Amazon.com, Cuisipro Silicone Pastry Brush, https://www.amazon.com/Cuisipro-747148-Silicone-Brush/dp/B001RRHT9K, Published as early as Dec. 2, 2012.

Amazon.com, iSi "Squid" Brush and Baster, https://www.amazon.com/iSi-K8611-Silicone-Squid-Baster/dp/B0002JA1Y4/ref=cm-cr-arp-d-product-top?ie=UTF8, Published as early as Nov. 22, 2005.

Additional Resources: Medical Device Connectors; FDA website at https://www.fda.gov/medical-devices/medical-device-connector/additional-resources-medical-device-connectors; retreived Feb. 28, 2020 (Year: 2020).

Squeasy Gear—Tube feeding blog, <URL: http://squeasygear.com/blog/tag/Tube+Feeding>, Published as early as Aug. 10, 2017.

BFed, Making Blenderized Tube Feeding That Flow, <URL: https://www.udelivermedical.com/making-blenderized-tube-feeding-that-flowl>, Published as early as May 4, 2018.

FLOWABLE FOOD FEEDING DEVICE

CROSS-REFERENCE TO RELATED APPLICATIONS

The present application is a continuation application of U.S. patent application Ser. No. 15/985,432, filed on 2018 May 21, which claims benefit of U.S. Prov. App. No. 62/607,740, filed on 2017 Dec. 19, and is a continuation-in-part application of U.S. patent application Ser. No. 15/697,794, filed on 2017 Sep. 7, which is a continuation application of U.S. patent application Ser. No. 14/685,441, filed on 2015 Apr. 13, which is a continuation-in-part application of U.S. Design Pat. App. No. 29476683, filed on 2013 Dec. 16, the entire contents of each of which are incorporated herein by reference.

STATEMENT RE: FEDERALLY SPONSORED RESEARCH/DEVELOPMENT

Not Applicable

BACKGROUND

The various embodiments and aspects described herein relate to a reusable food pouch for containing fluidic food products that can be consumed through a spout or a feeding tube.

Various reusable food pouches are currently marketed. However, these food pouches may be cumbersome to use and difficult to sanitize. For example, prior art reusable food pouches may have a flexible receptacle for holding the food product. A spout may be attached to the receptacle so that a toddler can suck the food product out of the receptacle when desired. The spout may be covered with a lid that stops fluid flow through the spout so that the user can store the food product within the reusable food pouch during the day and access the same and provide the same to the toddler when desired.

Unfortunately, these prior art reusable food pouches are cumbersome to use and difficult to sanitize.

BRIEF SUMMARY

A reusable food pouch is disclosed herein. The reusable food pouch may be completely disassembled so that all of the components of the reusable food pouch can be thoroughly cleaned and sanitized. Moreover, the reusable food pouch has a removably insertable one-way valve that can be inserted and used or removed depending on the viscosity of the food product being dispensed through the reusable food pouch. More particularly, if the food product has a water-like consistency, then the one-way valve may be inserted in the reusable food pouch to prevent spills if the reusable food pouch is laid on its side. If the food product has a consistency similar to thick oatmeal or applesauce, then the one-way valve may be removed and stored away to allow the toddler to easily suck the food product out of the spout and into his or her mouth.

More particularly, a container for holding flowable food product is disclosed. The container may comprise a deformable receptacle, a cover and a one way valve. The deformable receptacle may have a cavity for holding the flowable material. The receptacle may have a closed bottom and an opening at an upper end of the deformable receptacle. The cover may be attached to the deformable receptacle. The cover may have a reduced narrow spout for forcing the flowable food product out of the spout and into a mouth of a person. The one way valve may be disposed between the deformable receptacle and the cover or removed therefrom depending on a viscosity of the flowable food product. The one way valve is disposed between the receptacle and the cover for more viscous flowable food products and removed therefrom for less viscous flowable food products. Also, the one way valve may be disposed between the deformable receptacle and the cover for liquid food products and the one way valve may be removed from between the deformable receptacle and the cover for liquid food products with solid materials mixed with the liquid food products.

The cover may define an interior surface. The interior surface of the cover has a funnel shape that leads to the spout having a straight cylindrical configuration. The one way valve has an upper surface that may have a configuration identical to the interior surface of the cover.

The one way valve may have an outwardly protruding rib that engages the interior surface of the cover at the spout.

The cover may have a lid that engages with the spout to stop fluid flow through the spout when the lid is engaged to the spout and to allow fluid flow through the spout when the lid is disengaged from the spout.

The cover may have a downwardly protruding lip extending from the interior surface circumscribing the one way valve when the one way valve is seated on the interior surface of the cover.

The one way valve may have a lower surface and pull tab that extends below the lower surface in order to remove the one way valve from the cover when the one way valve is seated on the cover.

The one way valve may have a cross slit formed in a membrane.

In another aspect, a method of providing a flowable food product to a toddler is disclosed. The method may comprise the steps of providing a receptacle, a collar, a cover and a one way valve, the cover having a spout through which the toddler sucks out flowable food product disposed within the receptacle, the collar and cover capable of forming a seal with a flange portion of the receptacle so that a liquid tight seal is formed between the cover, flange portion of the receptacle and the collar; inserting the flange portion of the receptacle through the collar; filling the receptacle with a fluid having a viscosity about equal to a viscosity of water; disposing the one way valve between the flange portion of the receptacle and the cover so that the flowable food product does not flow out of the spout unless sidewalls of the receptacle are being compressed or suction is formed at the spout; and fastening the cover on the collar so as to compress the flange portion of the receptacle between the cover and the collar to form the seal with the flange portion.

In another aspect, a method of providing a flowable food product to a toddler is disclosed. The method may comprise the steps of providing a receptacle, a collar, a cover and a one way valve, the cover having a spout through which the toddler sucks out flowable food product disposed within the receptacle, the collar and cover capable of forming a seal with a flange portion of the receptacle so that a liquid tight seal is formed between the cover, flange portion of the receptacle and the collar; inserting the flange portion of the receptacle through the collar; filling the receptacle with a fluid having a viscosity about equal to a viscosity of a puree of vegetable and fruits; removing the one way valve between the flange portion of the receptacle and the cover so that the flowable food product does flow out of the spout without pressure on sidewalls of the receptacle; and fastening the cover on the collar so as to compress the flange portion of the receptacle between the cover and the collar to form the seal with the flange portion.

In accordance with other aspects of the present disclosure, there is provided a reusable food pouch used for tube feeding a patient. The reusable food pouch includes a deformable receptacle and a rigid cover attachable to the deformable receptacle, the rigid cover having a feeding tube connector for connection to a feeding tube or a syringe. When the deformable receptacle is squeezed, a flowable food product, e.g. a liquid or semi-liquid food, is forced out of the deformable receptacle and into the feeding tube or syringe.

In one aspect, there is provided a container for holding flowable food product, the container including a deformable receptacle having a cavity for holding the flowable food product, the deformable receptacle having a closed bottom and an opening at an upper end of the deformable receptacle, and the container further including a rigid cover attachable to the upper end of the deformable receptacle. The rigid cover has a male feeding tube connector that is uniquely connectable to a female feeding tube connector of a feeding tube, wherein, with the male feeding tube connector connected to the female feeding tube connector, the deformable receptacle and the feeding tube are in fluid tight fluid communication to allow the flowable food product to be forced out of the opening of the deformable receptacle and into the feeding tube when the deformable receptacle is squeezed.

The male feeding tube connector may comply with a United States Food and Drug Administration (FDA) recognized consensus standard.

The male feeding tube connector may comply with International Organization for Standardization (ISO) 80369-3.

The container may further include a valve removably disposable between the deformable receptacle and the rigid cover. The valve may have an upper surface that has a configuration identical to the interior surface of the rigid cover.

In another aspect, there is provided a container for holding flowable food product, the container including a deformable receptacle having a cavity for holding the flowable food product, the deformable receptacle having a closed bottom and an opening at an upper end of the deformable receptacle, and the container further including a rigid cover attachable to the upper end of the deformable receptacle. The rigid cover has a female feeding tube connector that is uniquely connectable to a male feeding tube connector of a syringe, wherein, with the female feeding tube connector connected to the male feeding tube connector, the deformable receptacle and the syringe are in fluid tight fluid communication to allow the flowable food product to be forced out of the opening of the deformable receptacle and into the syringe when the deformable receptacle is squeezed.

The female feeding tube connector may comply with a United States Food and Drug Administration (FDA) recognized consensus standard.

The female feeding tube connector may comply with International Organization for Standardization (ISO) 80369-3.

The container may further include a valve removably disposable between the deformable receptacle and the cover. The valve may have an upper surface that has a configuration identical to the interior surface of the rigid cover.

In another aspect, there is provided a method of providing a flowable food product to a patient, the method including providing a deformable receptacle having a cavity for holding the flowable food product, the deformable receptacle having a closed bottom and an opening at an upper end of the deformable receptacle, and the method further including filling the deformable receptacle with the flowable food product and attaching a rigid cover to the upper end of the deformable receptacle. The rigid cover has a male feeding tube connector that is uniquely connectable to a female feeding tube connector of a feeding tube, wherein, with the male feeding tube connector connected to the female feeding tube connector, the deformable receptacle and the feeding tube are in fluid tight fluid communication to allow the flowable food product to be forced out of the opening of the deformable receptacle and into the feeding tube when the deformable receptacle is squeezed. The method further includes connecting the male feeding tube connector to the female feeding tube connector of the feeding tube and squeezing the deformable receptacle to force the flowable food product out of the deformable receptacle and into the feeding tube.

The male feeding tube connector may comply with a United States Food and Drug Administration (FDA) recognized consensus standard.

The male feeding tube connector may comply with International Organization for Standardization (ISO) 80369-3.

The method may further include disposing a valve between the deformable receptacle and the rigid cover so that the flowable food product does not flow out of the opening of the deformable receptacle unless sidewalls of the deformable receptacle are being compressed or suction is formed at the male feeding tube connector. The valve may have an upper surface that has a configuration identical to the interior surface of the rigid cover.

In another aspect, there is provided a method of providing a flowable food product to a patient, the method including providing a deformable receptacle having a cavity for holding the flowable food product, the deformable receptacle having a closed bottom and an opening at an upper end of the deformable receptacle, and the method further including filling the deformable receptacle with the flowable food product and attaching a rigid cover to the upper end of the deformable receptacle. The rigid cover may have a female feeding tube connector that is uniquely connectable to a male feeding tube connector of a syringe, wherein, with the female feeding tube connector connected to the male feeding tube connector, the deformable receptacle and the syringe are in fluid tight fluid communication to allow the flowable food product to be forced out of the opening of the deformable receptacle and into the syringe when the deformable receptacle is squeezed. The method further includes connecting the female feeding tube connector to the male feeding tube connector of the syringe, squeezing the deformable receptacle and/or operating a plunger of the syringe to force the flowable food product out of the deformable receptacle and into the syringe, disconnecting the female feeding tube connector from the male feeding tube connector of the syringe, connecting the male feeding tube connector of the syringe to a female feeding tube connector of a feeding tube of the patient, and operating the plunger of the syringe to force the flowable food product out of the syringe and into the feeding tube.

The female feeding tube connector may comply with a United States Food and Drug Administration (FDA) recognized consensus standard.

The female feeding tube connector may comply with International Organization for Standardization (ISO) 80369-3.

The method may further include disposing a valve between the deformable receptacle and the rigid cover so that the flowable food product does not flow out of the opening of the deformable receptacle unless sidewalls of the deformable receptacle are being compressed or suction is formed at the female feeding tube connector. The valve may have an upper surface that has a configuration identical to the interior surface of the rigid cover.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
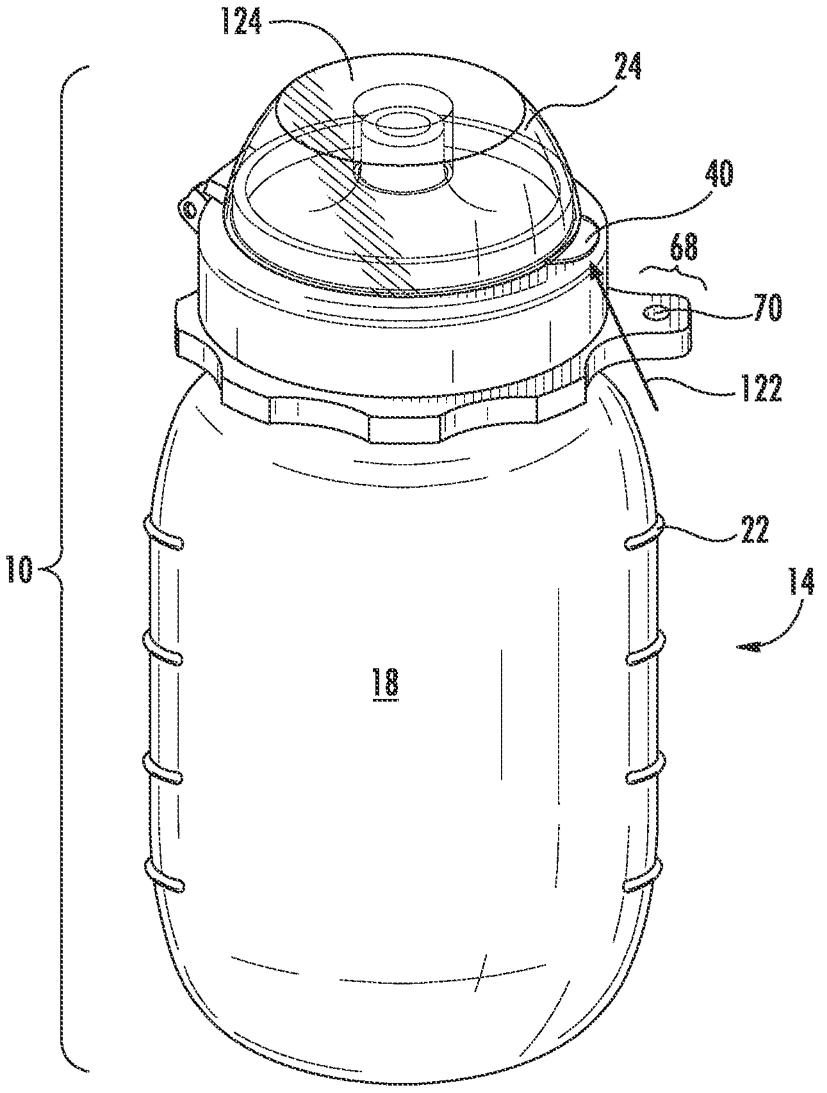
FIG. 1 is a perspective view of a reusable food pouch.

Referring now to the drawings, a reusable food pouch 10 is shown which can be used to feed a toddler a food product having a water-like liquid consistency (e.g., apple juice) or a somewhat more viscous consistency (e.g., applesauce). The reusable food pouch 10 has a removably insertable one-way valve 12 that when inserted provides a no spill functionality to the reusable food pouch 10 for water-like liquids and when removed provides free flow functionality to the reusable food pouch 10 for heavier consistency food products such as applesauce. The reusable food pouch 10 is capable of being disassembled and each component washed for reuse.

The reusable food pouch 10 has a deformable receptacle 14 which holds the food product therein. The deformable receptacle 14 is preferably fabricated from a silicone material but other materials are also contemplated. By way of example and not limitation, the receptacle 14 may be fabricated from an elastomeric material, plastic material, paper material and other materials that are known in the art or developed in the future. The receptacle 14 can be deformed as the toddler sucks on a spout 16 (see FIG. 4) to withdraw the food products from within the receptacle 14. By sucking on the spout 16, a vacuum is created within the receptacle 14 to withdraw the food product out of the receptacle 14 through the spout 16. As the food product is withdrawn out of the receptacle 14 and through the spout 16, the side walls 18 collapse inward. The receptacle 14 is deformable to an extent so that a majority of the food product within the receptacle 18 can be sucked out of the spout 16. Preferably, the reusable food pouch 10 allows for more than between about 50% to 95% removal of the food product from within the receptacle 14. In certain instances, the reusable food pouch 10 allows for 99% to 100% removal of the food product from within the receptacle 14.

Figure 2:
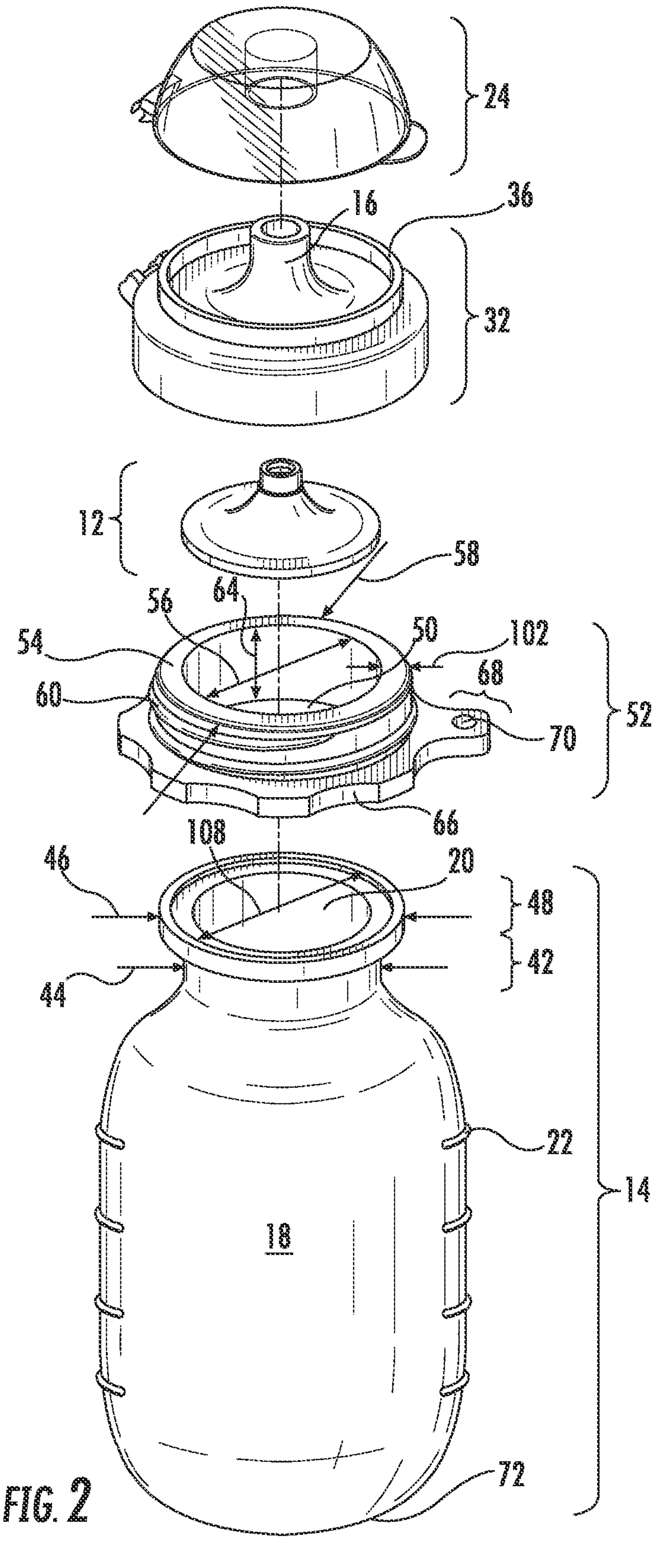
FIG. 2 is an exploded perspective view of the reusable food pouch shown in FIG. 1.
Figure 4:
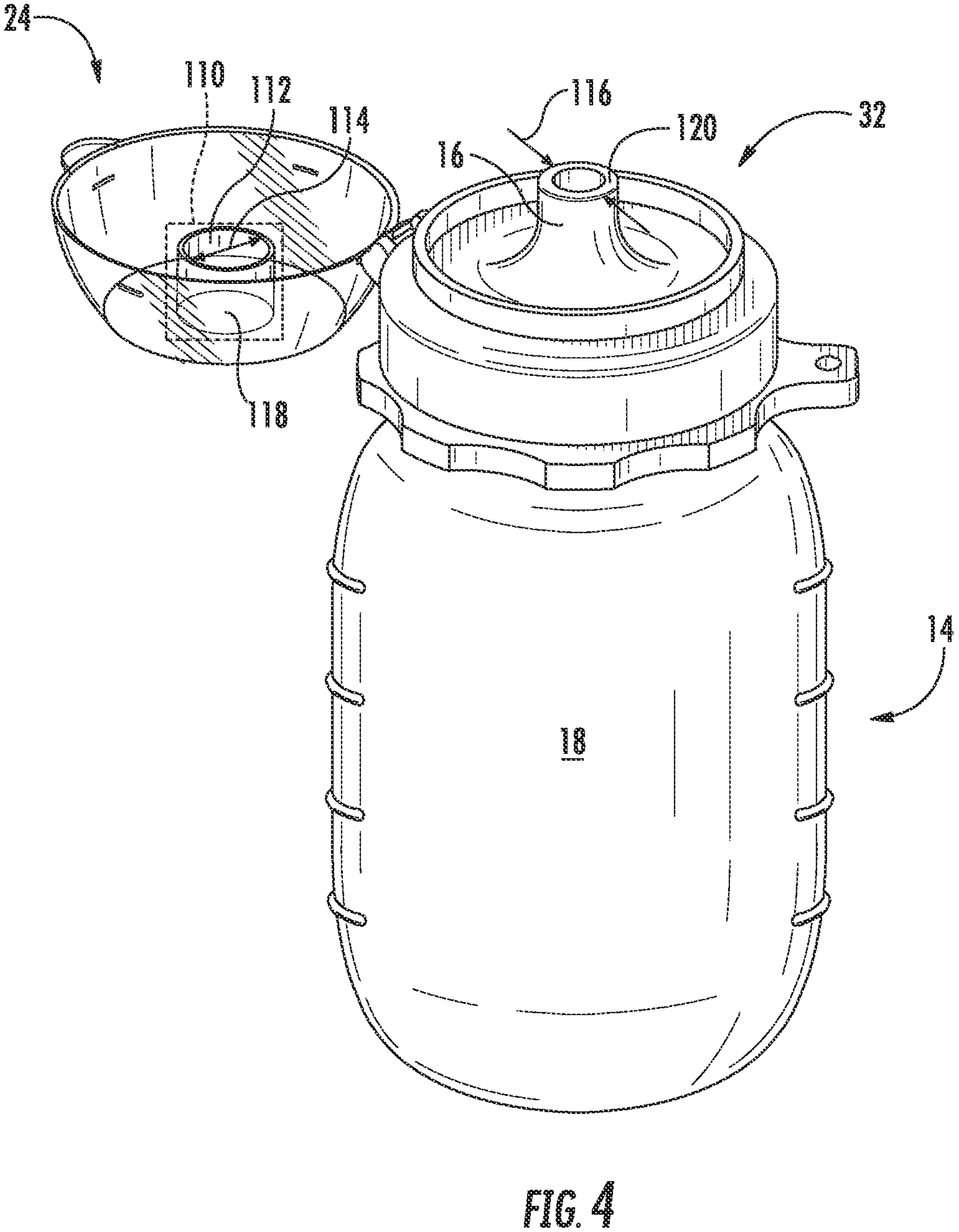
FIG. 4 is a perspective view of the reusable food pouch shown in FIG. 1 with the lid in the opened position and the side walls of the receptacle in a normal unbiased position.

After the food product is removed from the reusable food pouch 10, the receptacle 14 can be expanded back outward for refilling of the receptacle 14 and reuse of the reusable food pouch 10. The receptacle 14 can be expanded back outward either through the resiliency of the material from which the receptacle 14 is fabricated or by manual means. For example, if the receptacle 14 is fabricated from a silicone material, the physical characteristics of the silicone material may be designed so that its normal position is that as shown in FIG. 4. When food product is removed from the receptacle 14, the side walls 18 are now biased to be urged back outward. If the one-way valve 12 (see FIG. 2) is inserted in the reusable food pouch 10, air cannot reenter the receptacle 14 when the toddler removes his or her mouth from the spout 16. As such, the receptacle remains in the deformed or compressed position. When the toddler wants to consume more food product, the toddler can suck more food out of the spout 16 without having to suck air through the spout 16 until the food product reaches the spout 16. When the reusable food pouch 10 is being washed, the reusable food pouch 10 is disassembled and air is allowed to go back into the receptacle 14. In this instance, the side walls 18 may expand back outward due to the resiliency of the side walls 18 of the receptacle 14.

In contrast, if heavier consistency food is being disposed within the receptacle 14, the user may remove the one-way valve 12 for free flow of the heavier consistency food product through the spout 16. In this instance, the side walls 18 will extend back outward each time the toddler removes his or her mouth from the spout 16. To consume more food product from the receptacle 14, the toddler must initially squeeze the side walls 18 (see FIG. 3) until the food product reaches the spout 16 and squirt the food product through the spout 16 into the toddler's mouth. After the toddler has consumed all of the food product, the reusable food pouch 10 may be washed by disassembling the same. In doing so, the receptacle 14 may be fabricated from material that is resilient so that the side walls 18 of the receptacle 14 expand back outward.

Although the receptacle 14 has been described as being resilient in that the side walls 18 of the receptacle 14 expand back outward without human intervention, it is also contemplated that the receptacle 14 may be deformable but not resilient in that it is biased back outward through manual means or human intervention. In order to expand the side walls 18 of the receptacle 14, the user must apply pressure within the receptacle 14 to expand the side walls 18 back outward either through filling the receptacle 14 with water or physically inserting an object (e.g., finger or spoon) into an upper opening 20 of the receptacle 14 and spread out the sidewalls 18.

The receptacle 14 may also have graduation marks 22 to indicate an amount of fluid within the receptacle 14. By way of example and not limitation, when the side walls 18 of the receptacle 14 are not compressed, each graduation mark can represent one fluid ounce.

The receptacle 14 may also have a flat bottom 72 that is sufficiently rigid to allow the reusable food pouch 10 to be capable of being stood upright on a support surface.

All components of the reusable food pouch 10 may be fabricated from 100% food grade non-toxic materials that are BPA, PVC and PHTHALATE free.

Figure 3:
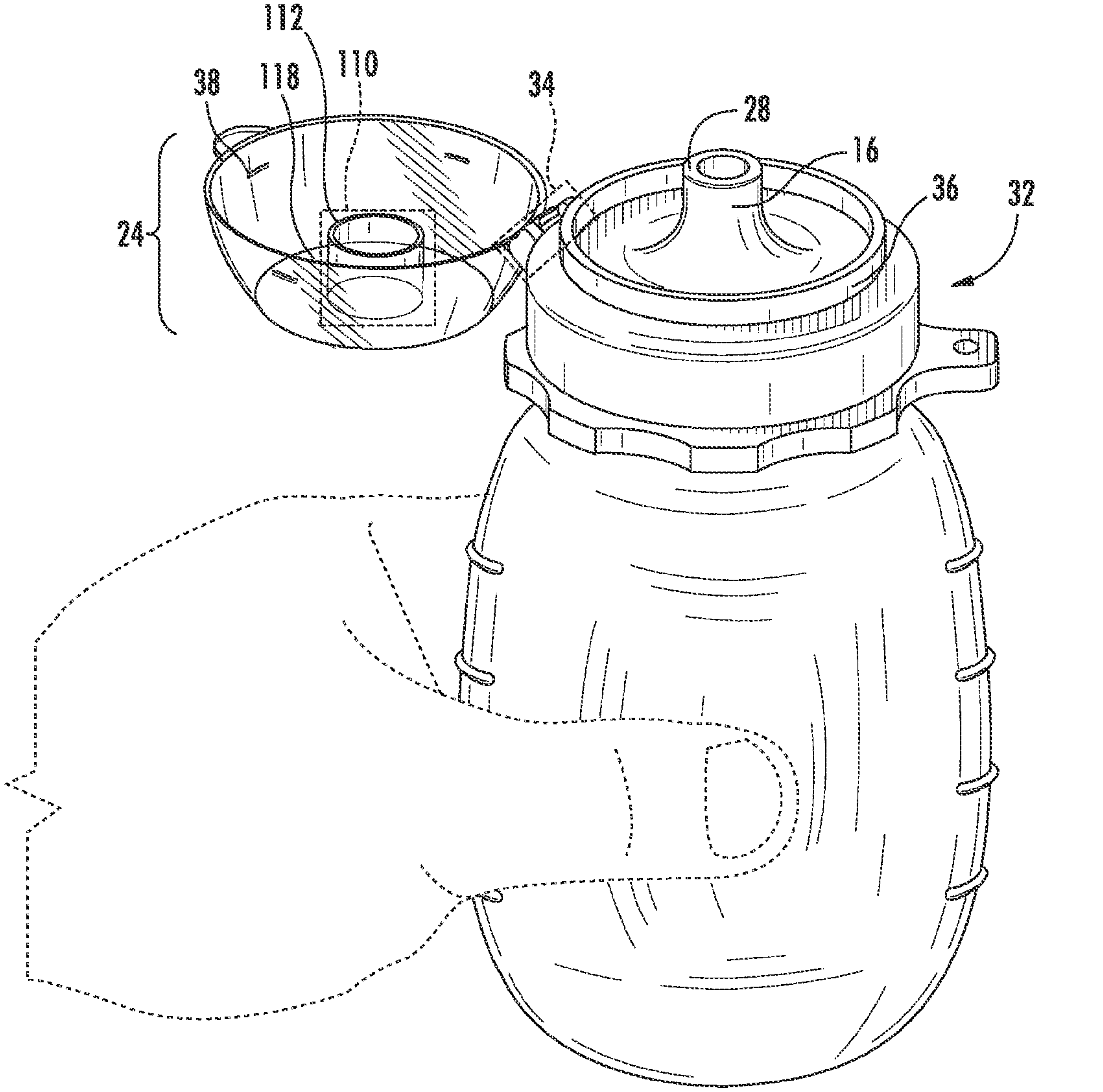
FIG. 3 is a perspective view of the reusable food pouch shown in FIG. 1 with a lid in an opened position and side walls of the receptacle being compressed.

The reusable food pouch 10 may have a lid 24 that can be traversed between the closed position (see FIG. 1) and an opened position (see FIG. 3). In the closed position, the lid 24 stops all fluid flow through the spout 16 so that the reusable food pouch 10 can be stored in a bag or other area that is jostled or handled. Inadvertent squeezing of the side walls 18 of the receptacle 14 will not cause the food product within the receptacle 14 to be squirted out of the spout 16. To this end, the lid 24 has a cylindrical sealing member 110 that is sized and configured to mate with the spout 16 when the lid 24 is in the closed position. The sealing member 26 forms a liquid tight seal around the spout 16 circumferentially and/or against an upper surface 28 of the spout 16 with the horizontal portion 18 of the lid 24.

The lid 24 is hinged to a cover 32 through a hinge mechanism 34. The cover 32 may have an upwardly directed flange 36 that circumscribes the spout 16. The upper end of the flange 36 may be flared outwardly and engage one or more inwardly directed protrusions 38 formed on the interior surface of the lid 24 in order to keep the lid 24 in the closed position. To traverse the lid 24 to the opened position, the user may press upward on a finger tab 40.

The receptacle 14 may have a neck portion 42 (see FIG. 2) which has an outer diameter 44 which is smaller than an outer diameter 46 of an outwardly directed flange portion 48. To assemble the reusable food pouch 10, the flange portion 48 is bent so as to be insertable through a through hole 50 of a collar 52. Once the flange portion 48 is inserted through the through hole 50 of collar 52, the flange portion 48 is expanded outward and rests on an upper surface 54 of the collar 52. The inner diameter 56 of the through hole 50 is about equal to the outer diameter 44 of the neck portion 42 of the receptacle 14. The outer diameter 58 of the collar 52 defined by the base of thread 60 is equal to about the outer diameter 48 of the flange portion 48 of the receptacle 14. As such, the flange portion 48 rests on the upper surface 54 of the collar 52. Also, the collar 52 does not deform the neck portion 42 of the flange portion 48 in that position. Preferably, the receptacle 14 is fabricated from an elastomeric material so that a seal is formed between the flange portion 48 and the collar 52 when the cover 32 is attached to the collar 52.

The collar 52 may be fabricated from a hard material (e.g., plastic) that is not deformable like the receptacle 14. The collar 52, as stated above, has threads 60 that mate with internal threads 62 (see FIG. 5) of the cover 32. A height 64 (see FIG. 2) of the collar 52 may be sized to a height of the neck portion 42 so that the collar 52 does not deform the receptacle 14 when mounted thereto. The collar 52 may additionally have finger grooves 66 around a circumference of the collar 52 to help the user to screw or unscrew the cover 32 from the collar 52 especially when the reusable food pouch 10 is wet and slippery. Additionally, the collar 52 may have a tab 68 with a through hole 70 so that the user can attach a loop to the reusable food pouch 10.

Figure 5:
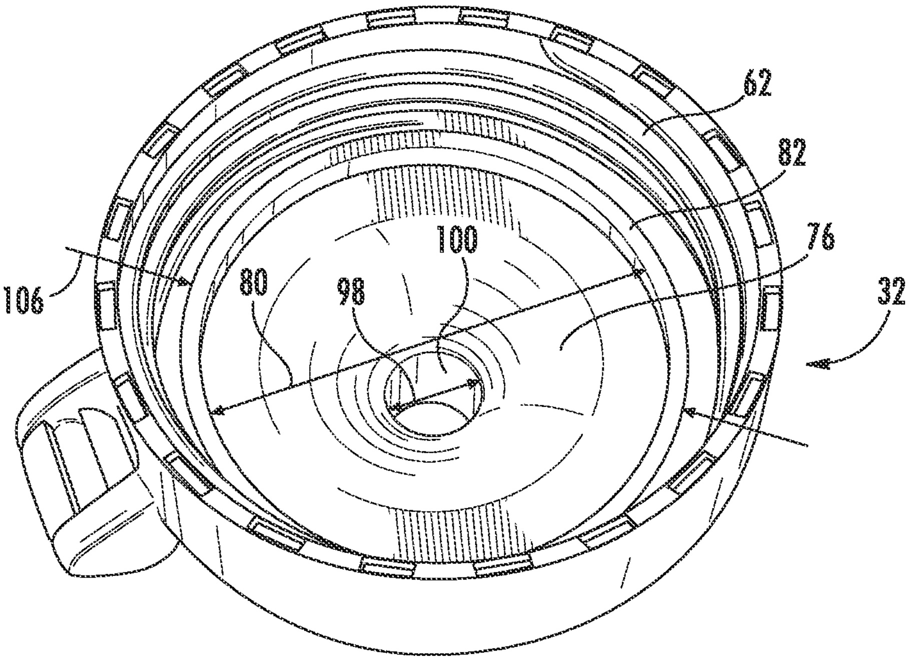
FIG. 5 is a bottom perspective view of a cover of the reusable food pouch shown in FIG. 1.
Figure 6:
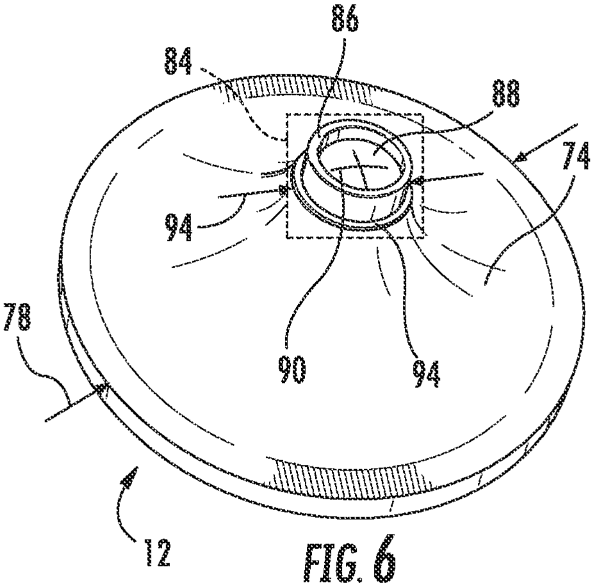
FIG. 6 is a top perspective view of a one-way valve of the reusable food pouch shown in FIG. 1.
Figure 7:
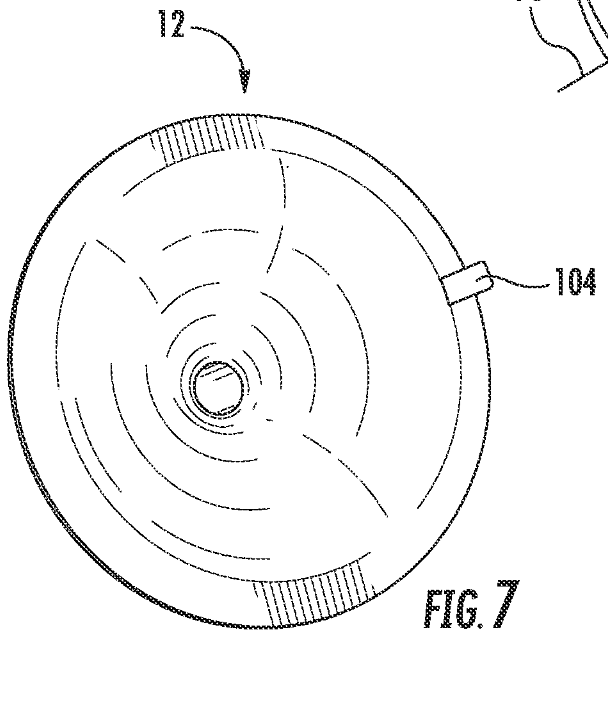
FIG. 7 is a bottom perspective view of the one-way valve shown in FIG. 6.
Figure 8:
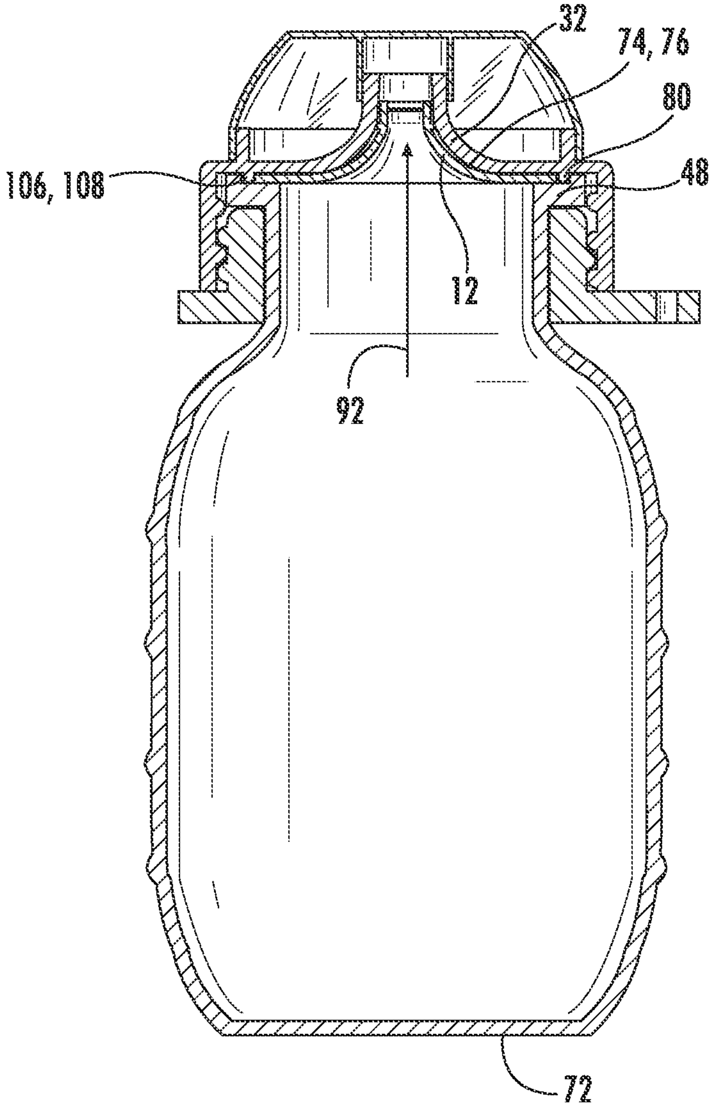
FIG. 8 is a cross-sectional view of the reusable food pouch shown in FIG. 1.

After the receptacle 14 is assembled onto the collar 52, the one-way valve 12 may be mounted to the underside of the cover 32 (see FIGS. 5 and 6). The one-way valve 12 has an upper surface 74 which mates with an undersurface 76 of the cover 32. The upper surface 74 of the one-way valve 12 is sized and configured to be a mirror image of the undersurface 76 of the cover 32. This is more clearly shown in FIG. 8. Accordingly, a liquid tight seal is formed between the surfaces 74, 76 of the one-way valve 12 and the cover 32. The one-way valve 12 additionally has an outer diameter 78 which is equal to about an inner diameter of a flange 82 of the cover 32. As shown in FIG. 8, the one-way valve 12 fits snugly within the flange 80.

The one-way valve 12 additionally has a valving mechanism 84 which extends straight upward from the upper surface 74 as a cylindrical wall 86. A membrane 88 is recessed within the cylindrical wall 86 and has a cross slit 90. The membrane 88 may have a slightly upwardly bowed configuration so that fluid can pass through the cross slit 90 in the direction 92 shown in FIG. 8 and does not permit fluid to flow back into the receptacle 14 through the cross slit 90 when the one-way valve 12 is inserted into the reusable food pouch 10. The one-way valve 12 additionally has a rib 94 that extends outward from the cylindrical wall 86 of the valving mechanism 84. The rib 94 presses against the cover 32 when the one-way valve 12 is mounted to the cover 32, as shown in FIG. 8. The rib 94 may have an outer diameter 96 which is slightly greater than an inner diameter 98 of the mating surface 100 on the cover 32. By pressing the cylindrical wall 86 slightly inward, this may create pressure at the cross slits 90 and along with the upward bowed configuration of the membrane 88 and further urge the cross slits 90 to remain closed to prevent air from reentering the receptacle 14 but allowing air to proceed out of the cross slits 90. Additionally, the rib 94 may also secure the one way valve 12 in the cover to mitigate the one way valve 12 from falling out during assembly or disassembly.

With the one-way valve 12 mounted to the cover 32 and the receptacle 14 mounted to the collar 52, the threads 62 of the cover 32 are threadably engaged to the threads 60 of the collar 52. When the cover 32 is cinched onto the collar 52, the one-way valve 12 and the flange portion 48 are compressed between the cover 32 and the collar 52. In particular, the upper surface 54 of the collar 52 has a thickness 102 larger than the flange 80 of the cover 32 and capable of pressing on the one-way valve 12 in order to form a liquid tight seal therebetween.

Moreover, the outer diameter 106 (see FIG. 5) of the flange 82 is about equal to an inner diameter 108 (see FIG. 2) of the flange portion 48 which protrudes upwardly. This is also illustrated in FIG. 8.

To disassemble the reusable food pouch 10, the cover 32 is unthreaded from the collar 52. The receptacle 14 being deformable is pulled out of the collar 52. Additionally, the one-way valve 12 is removed from the cover 32. To assist the user in removing the one-way valve 12, the one-way valve 12 may have a pull tab 104 on the bottom of the one-way valve 12. The one-way valve 12 may be fabricated from a elastomeric material including but not limited to silicone material, plastic material and other materials known in the art or developed in the future. The one-way valve 12 is preferably resilient in that the one-way valve 12 will spring back to its non-biased state. More particularly, the membrane 88 is resiliently deformable in order to allow fluid to pass through the cross slit 90 when pressure is applied to the side walls 18 of the receptacle 14 and to prevent air from entering through the cross slit 90 by traversing the cross slits 90 back to its original configuration.

As noted above, the cover 32 may also have a lid 24 which is pivotally attached to the cover 32 with a hinging mechanism 34. In the opened position, as shown in FIG. 4 the user can consume the food product within the receptacle 14 by sucking the food product out of the spout 16 or by depressing the side walls 18 as shown in FIG. 3. When the lid 24 is closed as shown in FIG. 1, the spout 16 is sealed so that the food product within the receptacle 14 cannot leak out of the reusable food pouch 10 even if compressive pressure is applied to the side walls 18.

The lid 24, as discussed above, may be operative to seal the spout 16. To this end, the lid 24 may have a sealing mechanism 110 formed on the underside of the lid 24 so that the ceiling mechanism 110 engages the spout 16 when the lid 24 is traversed to the closed position. The sealing mechanism 110 may be a cylindrical wall 112 that is sized and configured to press against the spout 16 in order to provide a fluid tight seal therebetween, namely, between the cylindrical wall 112 and the spout 16. To this end, an inner diameter 114 of the cylindrical wall 112 may be equal to an outer diameter 116 of the spout 16. The contact between the cylindrical wall 112 and the spout 16 may form the fluid tight seal. Moreover, the lid 24 may have a lower surface 118 which may optionally engage the upper surface 120 of the spout 16 to further form a liquid tight seal to prevent fluid from flowing out of the spout 16 when the lid 24 is in the closed position.

The lid 24 may remain in the closed position, as discussed above, with the protrusion 38 that interferes with the upper edge of the flange 36 of the cover 32. In order to traverse the lid 24 to the opened position, the user may press upward 122 (see FIG. 1) to traverse the lid 24 to the opened position. The lid 24 may also have a flat top 124 to allow the reusable food pouch to be inverted upside down if desired. Both the cover 32 and lid 24 may be fabricated from a hard material such as plastic.

The flowable food product and whether the one way valve is used in the pouch have been described in part by its viscosity. If the viscosity is low or similar to that of water, then the pouch has been described so that the one way valve is utilized as part of the reusable food pouch. Conversely, if the viscosity is high or similar to that of applesauce, then the pouch has been described so that the one way valve is not utilized as part of the reusable food pouch. More particularly, the one way valve may be removed from the pouch and stored when the flowable food product being dispensed has a viscosity of less than about 5 Pa-s. Conversely, the one way valve may be used with the pouch when the flowable food product being dispensed has a viscosity of greater than 5 Pa-s.

Figure 9:
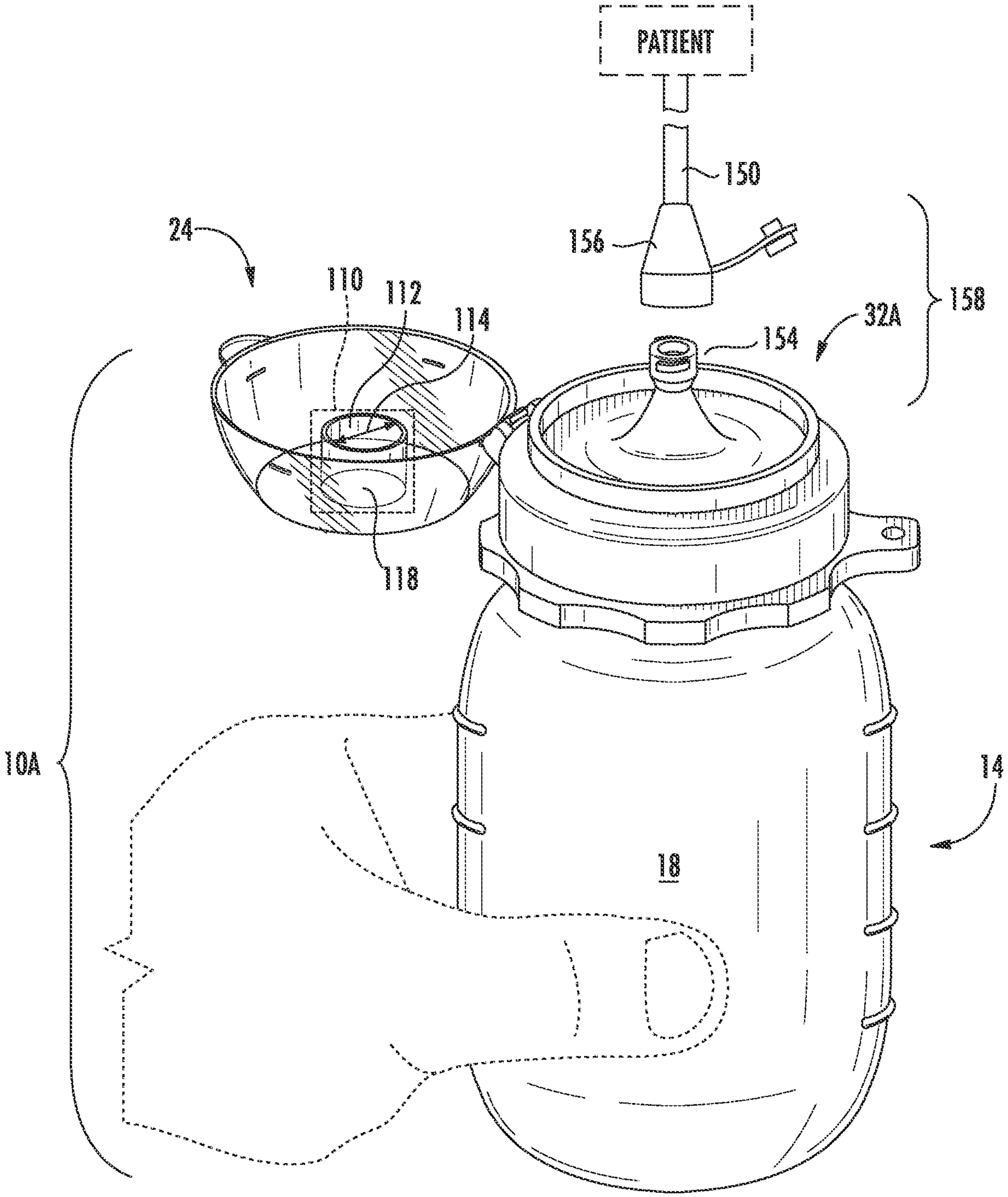
FIG. 9 is a perspective view of a reusable food pouch used for tube feeding a patient, together with a portion of a feeding tube and schematic representation of a patient.
Figure 11:
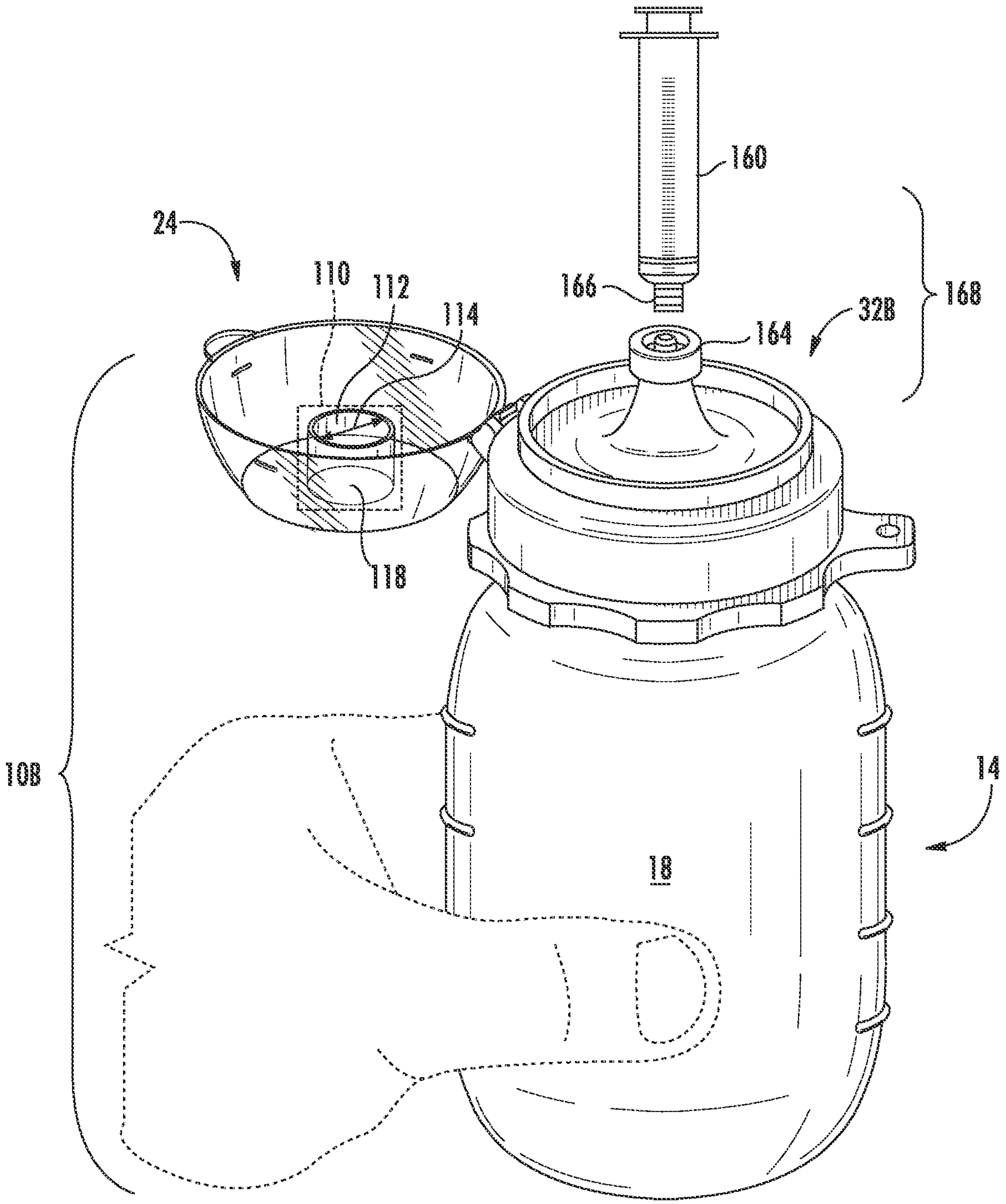
FIG. 11 is a perspective view of another reusable food pouch used for tube feeding a patient, together with a syringe.

Various aspects of the present disclosure pertain to a reusable food pouch 10A, 10B used for tube feeding a patient as shown in FIGS. 9 and 11. The patient may be a human patient or an animal patient, e.g. a pet dog or cat or a wild animal. The reusable food pouch 10A, 10B may be the same as the reusable food pouch 10 described above with respect to FIGS. 1-8 except that the cover 32 may be replaced with a cover 32A or 32B and the lid 24 and/or one-way valve 12 may be modified as described below. In this regard, the reusable food pouch 10A, 10B may include the deformable receptacle 14 having side walls 18 and the lid 24 having the sealing mechanism 110 including the cylindrical wall 112 and upper surface 118. The reusable food pouch 10A, 10B may further include any or all of the features of the reusable food pouch 10 described with respect to FIGS. 1-8, including the one-way valve 12 and the collar 52.

As shown in FIG. 9, the reusable food pouch 10A may have a cover 32A that includes, in place of the spout 16 of the cover 32 (see FIG. 4), a male feeding tube connector 154. The male feeding tube connector 154 may be a male ENFit™ connector as shown, as may be found on feeding sets and syringes that comply with International Organization for Standardization (ISO) 80369-3. The United States Food and Drug Administration (FDA) has recently listed ISO 80369-3 as a recognized consensus standard. Also shown in FIG. 9 is a portion of a feeding tube 150 of a patient. The feeding tube 150 may be of any known type and disposed in any known way with respect to the patient, e.g. via the mouth or nose (e.g. nasogastric, nasodueodenal, and nasojejunal tubes) or surgically (e.g. esophagostomy, gastrostomy, gastrojejunal, transjejunal, and jejunostomy tubes). The feeding tube 150 may have a female feeding tube connector 156, which may be a female ENFit' connector as shown, as may be found on feeding tubes that comply with ISO 80369-3.

The male feeding tube connector 154 is uniquely connectable to the female feeding tube connector 156, for example, by virtue of having a structure designed to mate only with the female feeding tube connector 156 from among commonly used medical devices. As such, the male feeding tube connector 154 and the female feeding tube connector 156 may function as a connector pair 158. Oftentimes a patient's body may be connected to multiple tubes, masks, etc. whose input and output connector designs may look similar and may function similarly enough that incorrect connections may be attempted. If the patient or the patient's caretaker confuses these connectors with each other and inadvertently connects a feeding set or syringe to a patient's trach tube, ventilator, or IV line, or inadvertently connects the patient's urinary catheter to the patient's feeding tube, the results can be catastrophic to the patient. By making the male feeding tube connector 154 uniquely connectable to the female feeding tube connector 156, such inadvertent connection of the male feeding tube connector 154 to the wrong tube, mask, etc. can be prevented.

In all respects other than the replacement of the spout 16 with the male feeding tube connector 154, the cover 32A may be identical to the cover 32. For example, like the cover 32, the cover 32A may be fabricated from a hard material such as plastic and may thus be rigid, and the cover 32A may have the same structural features as the cover 32 for engaging with the valve 12, collar 52, and lid 24.

Connecting the male feeding tube connector 154 and the female feeding tube connector 156 may place the deformable receptacle 14 in fluid tight fluid communication with the feeding tube 150. When the deformable receptacle 14 is thereafter squeezed, flowable food product may be forced out of the opening 20 of the deformable receptacle 14 (see FIG. 2) and into the feeding tube 150. In this way, a person assisting the patient may squeeze the deformable receptacle 14 of the reusable food pouch 10A to feed all or a portion of the flowable food product to the patient. Because of the relative ease of squeezing the deformable receptacle 14 with one's hand, the reusable food pouch 10A may in some cases allow the patient to feed him/herself without assistance. Oftentimes, a patient who is relying on a feeding tube 150 may be in a greatly weakened state due to the underlying sickness or injury. The patient may not be able to get up from a sitting or lying down position or may be unable to reach far from a bed. Thus, it is often unrealistic to expect the patient him/herself to operate equipment conventionally associated with a feeding tube 150, such as in the case of gravity feeding or pump feeding. For example, in the case of gravity feeding, the patient may not have the strength to stand up or reach an IV pole supporting the feeding apparatus. Moreover, selecting correct settings for gravity feeding or operating an electric pump may require skills and experience that the patient does not have. Because the reusable food pouch 10A can be used simply by squeezing the deformable receptacle 14, the patient does not need to leave his/her bed or possess specialized knowledge. Even a patient in a severely weakened state may be able to squeeze the deformable receptacle 14 while otherwise resting, and the amount of food to be delivered may be intuitively controlled by squeezing harder or softer, without any training. In this way, the reusable food pouch 10A may allow the patient to self-feed, lessening the burden imposed by the patient on other people. Being able to feed him/herself may have great significance to a patient who does not wish to be a burden or who wishes to preserve a sense of dignity.

For subsequent refilling and/or cleaning of the reusable food pouch 10A, the male feeding tube connector 154 may be disconnected from the female feeding tube connector 156 and the reusable food pouch 10A including the cover 32A may be disassembled in the same way as the reusable food pouch 10 having the cover 32. Thereafter, the reusable food pouch 10A may be cleaned, refilled, and reassembled for further use.

Figure 10:
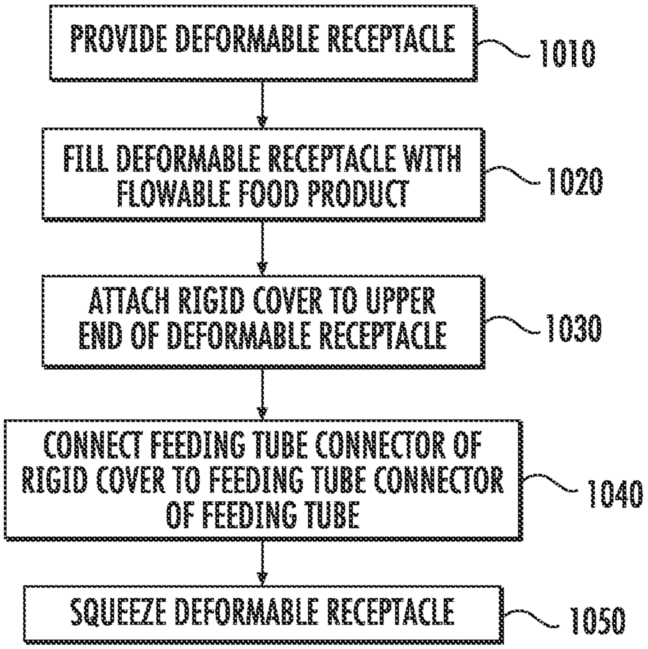
FIG. 10 is an example feeding process in relation to the reusable food pouch shown in FIG. 9.

FIG. 10 is an example feeding process in relation to the reusable food pouch 10A shown in FIG. 9. With the reusable food pouch 10A initially in a disassembled state, the process begins with providing the deformable receptacle 14 of the reusable food pouch 10A (step 1010) and filling the deformable receptacle 14 with flowable food product (step 1020). Once the deformable receptacle 14 is filled, the collar 52 may be provided and assembled to the deformable receptacle 14 as described above, optionally with the one-way valve 12, and the process continues with attaching the cover 32A to the upper end of the deformable receptacle 14 (step 1030). For example, the cover 32A may be attached to the deformable receptacle 14 in the same way as described above with respect to the cover 32, e.g., by threadably engaging threads 62 of the cover 32A to threads 60 of the collar 52.

As described above in relation to the reusable food pouch 10, the optional one-way valve 12 provides a no spill functionality to the reusable food pouch 10A for water-like liquids. Removing the one-way valve 12 provides free flow functionality to the reusable food pouch 10A for heavier consistency food products. Additionally, the one-way valve 12 prevents air or liquid from reentering the deformable receptacle 14 when the patient or patient's caretaker stops squeezing the deformable receptacle 14. For example, while squeezing the deformable receptacle 14 to feed the patient, the person squeezing the deformable receptacle 14 might wish to take a break if his/her hand gets tired or might wish to reposition his/her hand. For these reasons, or by accident, the person might stop squeezing for a short time. During these moments when the deformable receptacle 14 is not being squeezed, the deformable receptacle 14 may have a tendency to re-expand due to its resiliency, sucking recently expelled food product back into the deformable receptacle 14. The one-way valve 12 avoids this issue by preventing backflow of already-expelled food product in the feeding tube. Thus, a potentially unsanitary backflow condition can be avoided.

With the reusable food pouch 10A assembled, the process continues with connecting the male feeding tube connector 154 of the cover 32A to the female feeding tube connector 156 of the feeding tube 150 (step 1040). During this step, the one-way valve 12 may provide additional functionality in preventing air from entering the deformable receptacle 14 when the user is trying to connect the male and female connectors 154, 156. Just after assembly and prior to connecting the male feeding tube connector 154 to the female feeding tube connector 156 in step 1040, the user squeezes the deformable receptacle 14 slightly in order to force out any excess air in the deformable receptacle 14. The reusable food pouch 10A will be ready to provide food to the patient without first expelling air, which may help to avoid excess gas buildup in the patient's digestive system. After the patient or patient's caretaker squeezes the deformable receptacle 14 slightly to force excess air out, the deformable receptacle 14 will be in the deformed or compressed position with the food product near the exit of the reusable food pouch 10A ready to be expelled by the slightest squeeze. Without the one way valve, when the user releases the deformable receptacle, air would reenter the deformable receptacle through the spout. The resiliency of the receptacle 14 tends to draw air back in. However, with the one way valve, air does not reenter the spout because the one way valve is keeping the air out and keep air from entering the deformable receptacle through the spout. The user may then easily connect the male feeding tube connector 154 to the female feeding tube connector 156 using only two hands. Since the one-way valve prevents air from reentering the deformable receptacle 14, it is not necessary to hold the deformable receptacle 14 in a partly compressed state while connecting the male and female connectors. In this way, the one-way valve 12 may make it easier for one person to connect the male and female connectors 154, 156 without air entering the receptacle 14. With the deformable receptacle 14 and the feeding tube 150 now in fluid tight fluid communication, the deformable receptacle 14 may be squeezed to force the flowable food product out of the deformable receptacle 14 and into the feeding tube 150 (step 1050).

The reusable food pouch 10B shown in FIG. 11 is used for tube feeding the patient via a syringe 160. That is, in a two-stage process, flowable food product may be loaded into the syringe 160 using the reusable food pouch 10B and may thereafter be ejected from the syringe 160 into a feeding tube of a patient like the feeding tube 150 of FIG. 9. As shown in FIG. 11, the reusable food pouch 10B may have a cover 32B that includes, in place of the spout 16 of the cover 32 (see FIG. 4), a female feeding tube connector 164. The female feeding tube connector 164 may be a female ENFit™ connector as shown, as may be found on feeding tubes that comply with ISO 80369-3. Also shown in FIG. 11 is the syringe 160. The syringe 160 has a male feeding tube connector 166, which may be a male ENFit™ connector as shown, as may be found on feeding sets and syringes that comply with ISO 80369-3. The female feeding tube connector 164 is uniquely connectable to the male feeding tube connector 166, for example, by virtue of having a structure designed to mate only with the male feeding tube connector 166 from among commonly used medical devices. As such, the female feeding tube connector 164 and the male feeding tube connector 166 may function as a connector pair 168, preventing the inadvertent connection of the female feeding tube connector 164 to the wrong tube, mask, etc. in the same way as described above in relation to the connector pair 158 of FIG. 9.

In all respects other than the replacement of the spout 16 with the female feeding tube connector 164, the cover 32B may be identical to the cover 32. For example, like the cover 32, the cover 32B may be fabricated from a hard material such as plastic and may thus be rigid, and the cover 32B may have the same structural features as the cover 32 for engaging with the valve 12, collar 52, and lid 24.

Connecting the female feeding tube connector 164 and the male feeding tube connector 166 may place the deformable receptacle 14 in fluid tight fluid communication with the syringe 160. When the deformable receptacle 14 is thereafter squeezed and/or the plunger of the syringe 160 is operated (e.g. pulled), flowable food product may be forced out of the opening 20 of the deformable receptacle 14 (see FIG. 2) and into the syringe 160. In this way, a person assisting the patient may squeeze the deformable receptacle 14 of the reusable food pouch 10B and/or operate the plunger of the syringe 160 to load all or a portion of the flowable food product into the syringe 160. A variety of loading methods are contemplated. For example, before or after connecting the syringe 160 to the cover 32B, one might invert the reusable food pouch 10B so that the female feeding tube connector 164 faces downward and any excess air in the deformable receptacle 14 moves upward away from the female feeding tube connector 164. The plunger of the syringe 160 may then be pulled downward to draw the flowable food product into the syringe 160 without air bubbles. If the one-way valve 12 is used, air may be expelled from the reusable food pouch 10B by squeezing the deformable receptacle 14 as described above in relation to the reusable food pouch 10A. If one expels air in this way prior to connection of the syringe 160 to the reusable food pouch 10B, it may be possible to avoid drawing air bubbles into the syringe 160 without having to invert the reusable food pouch 10B. One can simply squeeze the reusable food pouch 10B slightly to expel the excess air, release the receptacle 14 (since the one-way valve 12 prevents air from re-entering the receptacle), connect the connectors 164, 166, using both hands and pull up on the plunger of the syringe 160, leaving the reusable food pouch 10B upright (e.g. on a table) or in any position that is convenient. Because the one-way valve 12 keeps the expelled air from reentering the deformable receptacle 14, it is easy to connect the connectors 164, 166 using only two hands, and the flowable food product may be drawn into the syringe 160 without air bubbles with the reusable food pouch 10B held at any angle.

Alternatively, a person loading the syringe 160 may squeeze the deformable receptacle 14 to load the syringe 160. For example, with one hand, a person may squeeze the deformable receptacle 14, causing the plunger of the syringe 160 to move outward as the flowable food product enters the syringe 160. With the other hand, the person may slightly push the plunger inward so as to regulate the filling of the syringe 160 and, in some cases, prevent the plunger from fully detaching from the syringe 160. If the deformable receptacle 14 is squeezed to load the syringe 160, it is further contemplated that the person might simultaneously squeeze the deformable receptacle 14 and pull the plunger of the syringe 160, thereby distributing the muscle work between two hands and making the person loading the syringe 160 less likely to become sore or fatigued. A person using a combination of squeezing the deformable receptacle 14 and pulling the plunger of the syringe 160 may easily adjust his/her reliance on the squeezing action or the plunger action throughout the day in response to muscle fatigue in one or both hands.

The assisting person or patient may thereafter disconnect the female feeding tube connector 164 from the male feeding tube connector 166 and feed the patient by connecting the syringe 160 to a feeding tube of the patient and operating (e.g. pushing) the plunger of the syringe 160. For subsequent refilling and/or cleaning of the reusable food pouch 10B, the reusable food pouch 10B including the cover 32B may be disassembled in the same way as the reusable food pouch 10 having the cover 32. Thereafter, the reusable food pouch 10B may be cleaned, refilled, and reassembled for further use.

Figure 12:
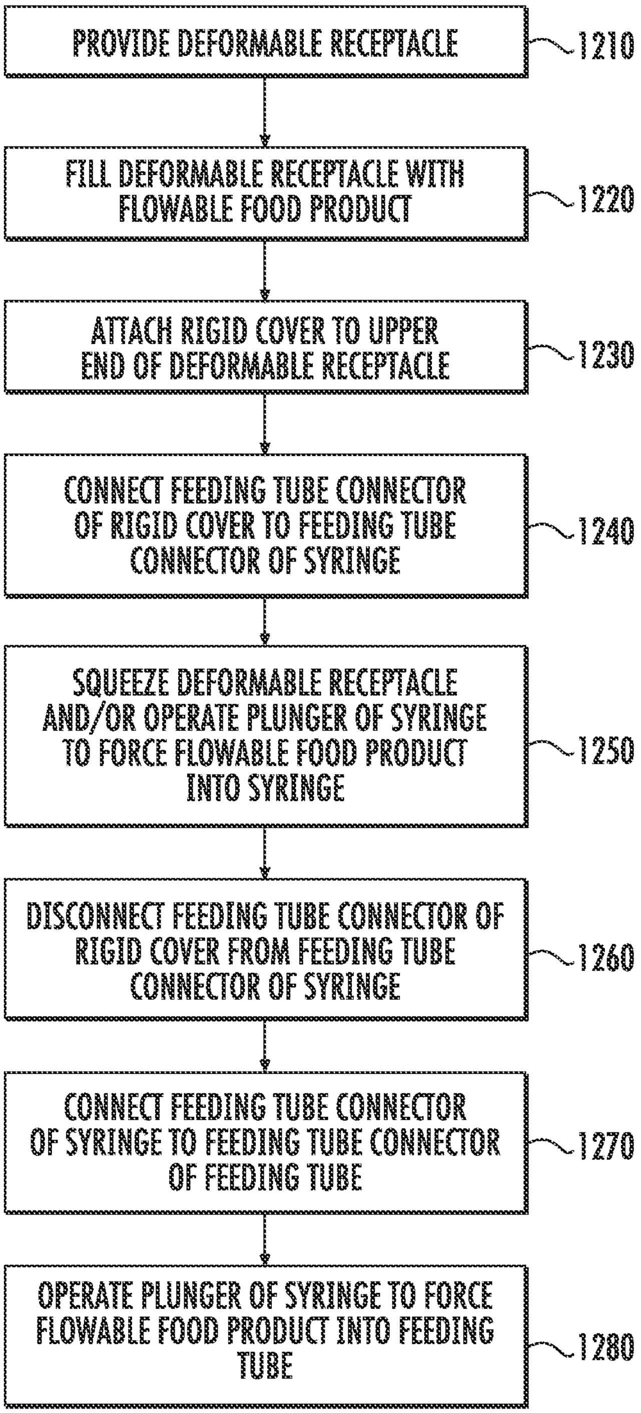
FIG. 12 is an example feeding process in relation to the reusable food pouch shown in FIG. 11.

FIG. 12 is an example feeding process in relation to the reusable food pouch 10B shown in FIG. 11. With the reusable food pouch 10B initially in a disassembled state, the process begins with providing the deformable receptacle 14 of the reusable food pouch 10B (step 1210) and filling the deformable receptacle 14 with flowable food product (step 1220). Once the deformable receptacle 14 is filled, the collar 52 may be provided and assembled to the deformable receptacle 14 as described above, optionally with the one-way valve 12, the process continues with attaching the cover 32B to the upper end of the deformable receptacle 14 (step 1230). For example, the cover 32B may be attached to the deformable receptacle 14 in the same way as described above with respect to the cover 32, e.g., by threadably engaging threads 62 of the cover 32B to threads 60 of the collar 52. The one-way valve 12 may provide the same functionality as described in relation to the reusable food pouch 10A, in addition to in some cases making it unnecessary to invert the reusable food pouch 10B when loading the syringe 160 as described above.

With the reusable food pouch 10B thus assembled, the process continues with connecting the female feeding tube connector 164 of the cover 32B to the male feeding tube connector 166 of the syringe 160 (step 1240). Then, with the deformable receptacle 14 and the syringe 160 now in fluid tight fluid communication, the deformable receptacle 14 is squeezed and/or the plunger of the syringe 160 is operated as described above to force the flowable food product out of the deformable receptacle 14 and into the syringe 160 (step 1250).

Once the syringe 160 is loaded with the desired amount of the flowable food product, the female feeding tube connector 164 of the cover 32B is disconnected from the male feeding tube connector 166 of the syringe 160 (step 1260) and the male feeding tube connector 166 of the syringe 160 is connected to a female feeding tube connector of the patient's feeding tube such as the female feeding tube connector 156 of the feeding tube 150 shown in FIG. 9 (step 1270). Lastly, with the syringe 160 and the patient's feeding tube now in fluid tight fluid communication, the plunger of the syringe 160 is operated (e.g. pushed, either manually or with a syringe actuator) to force the flowable food product out of the syringe 160 and into the patient's feeding tube (step 1280).

By including a feeding tube connector 154, 164 that is uniquely connectable to a feeding tube connector 156, 166 of a feeding tube 150 or syringe 160, such as one having an ENFit™ connector design, the cover 32A, 32B allows the reusable food pouch 10A, 10B to be used for tube feeding a patient while minimizing the risk of inadvertently providing the flowable food product to an incorrect tube, mask, etc. that is not supposed to receive food. At the same time, the design of the reusable food pouch 10A, 10B including the deformable receptacle 14 allows a patient or a person assisting the patient to perform tube feeding in unconventional ways that may be advantageous relative to conventional options such as gravity feeding or pump feeding, or conventional syringe feeding. Electric pumps and IV poles used for conventional tube feeding may be expensive and require training to use. They may also be bulky or take up a lot of space, which has the effect of making the patient less mobile or limiting the places where the patient may tube feed. By using the reusable food pouch 10A as described with respect to FIGS. 9 and 10, an untrained person with reduced strength (like the patient him/herself) may easily administer the feeding, even in places where there is no room for bulky equipment. The amount of food can be controlled intuitively by a simple squeeze of the hand. In the case of connecting the reusable food pouch 10B to a syringe 160 as described with respect to FIGS. 11 and 12, air may first be removed from the reusable food pouch 10B by squeezing the deformable receptacle 14, making it unnecessary to invert the reusable food pouch 10B while loading the syringe 160. This may make it possible to load the syringe 160 with one hand, with the reusable food pouch 10B sitting on a table. Squeezing the deformable receptacle 14 also offers an alternative way of loading the syringe 160 (e.g. rather than only pulling the plunger) that may use larger extrinsic muscles outside the hand and may be easier to perform one-handedly and repeatedly. In this latter regard, as noted above, a combination of squeezing the deformable receptacle 14 and pulling the plunger of the syringe 160 may be performed, thus distributing the muscle work between two hands and making the person loading the syringe 160 less likely to become sore or fatigued.

As described above, the reusable food pouch 10A, 10B may include the one-way valve 12 of the reusable food pouch 10. In this regard, the cover 32A, 32B may be designed to have an undersurface 76 that is identical to the undersurface 76 of the cover 32. In this way, the upper surface 74 of the one-way valve 12 may mate with the undersurface 76 of any of the covers 32, 32A, 32B. Alternatively, if the undersurface 76 of the cover 32A, 32B is modified to accommodate the replacement of the spout 16 with the male feeding tube connector 154 or female feeding tube connector 156, then the upper surface 74 of the one-way valve 12 may be correspondingly modified to mate with the modified undersurface 76 of the cover 32A, 32B.

The sealing mechanism 110 of the lid 24, which may include the cylindrical wall 112 and upper surface 118 as shown in FIGS. 9 and 11, may be variously designed such that an inner diameter 114 of the cylindrical wall 112 is equal to an outer diameter of the male feeding tube connector 154 of the cover 32A or equal to an outer diameter of the female feeding tube connector 164 of the cover 32B. That is, separate lids 24 may be provided for each of the covers 32, 32A, 32B. Alternatively, a single lid 24 may be used for any of the covers 32, 32A, 32B. For example, the cylindrical wall 112 of the lid 24 may be conical or otherwise tapered or stepped so as to have a varying inner diameter 114 at different heights when the lid 24 is closed on the cover 32, 32A, 32B. These different heights may match the heights of the spout 16, male feeding tube connector 154, and female feeding tube connector 164, such that each of the spout 16, the male feeding tube connector 154, and the female feeding tube connector 164 extends to a height in the lid 24 where the inner diameter 114 of the cylindrical wall 112 is equal to the outer diameter of the spout 16, male feeding tube connector 154, or female feeding tube connector 164. It should also be noted that the cover 32 may be designed so that the outer diameter 116 of the spout 16 is equal to the outer diameter of at least one of the male feeding tube connector 154 and the female feeding tube connector 164, thus allowing only a single lid 24 as illustrated to be used with at least two of the covers 32, 32A, 32B without modification.

Two or more of the covers 32, 32A, 32B may be provided together with the deformable receptacle 14 as a reusable food pouch kit along with one or more lids 24 valves 12, and/or collars 52. In this way, a person may freely exchange the covers 32, 32A, 32B (and possibly corresponding lids 24 and/or valves 12 as described above) depending on how the reusable food pouch 10, 10A, 10B will be used. For example, a patient may be fed on one occasion with the reusable food pouch 10A having the cover 32A connected to the patient's feeding tube 150 and on another occasion with the reusable food pouch 10B having the cover 32B via a syringe 160, where the deformable receptacle 14 and other parts are shared and the cover 32A is simply swapped for the cover 32B.

In the example of FIGS. 9 and 10, the cover 32A includes a male feeding tube connector 154 that connects to a female feeding tube connector 156 of a feeding tube 150. However, the disclosure is not intended to be limited to this. The feeding tube connector 154 of the cover 32A may instead be a female connector, while the feeding tube connector 156 of the feeding tube 150 may instead be a male connector.

Similarly, in the example of FIGS. 11 and 12, the cover 32B includes a female feeding tube connector 164 that connects to a male feeding tube connector 166 of a syringe 160. However, the disclosure is not intended to be limited to this. The feeding tube connector 164 of the cover 32B may instead be a male connector, while the feeding tube connector 166 of the syringe 160 may instead be a female connector (for subsequent connection to a male feeding tube connector of a patient's feeding tube).

The examples of FIGS. 9-12 describe connections between the cover 32A, 32B, a feeding tube 150, and a syringe 160. Such connections are not necessarily limited to direct connections and may in some cases be indirect. For example, the connection of the cover 32A or syringe 160 to a feeding tube 150 may be via an extension set that extends the feeding tube 150.

As explained above, the reusable food pouch 10A, 10B described in relation to FIGS. 9-12 may be a modified version of the reusable food pouch 10 of FIGS. 1-8. However, the disclosure is not intended to be limited to this. It is envisioned that other deformable receptacles and covers might be used in accordance with the embodiments of FIGS. 9-12.

As described above, the receptacle 14 may have graduation marks 22 to indicate an amount of fluid within the receptacle 14. The graduation marks 22 may be in the form of ridges that protrude from the receptacle 14. Such graduation marks 22 or other tactile features may provided to function as a grip for the reusable food pouch 10, 10A, 10B that helps prevent the reusable food pouch 10, 10A, 10B from slipping in a person's hand. Such a grip is especially useful in the case of a patient self-feeding him/herself while in a weakened state, where the patient's grasp of the receptacle 14 may be weak or unsteady.

In the examples described in relation to FIGS. 1-12, the reusable food pouch 10, 10A, 10B has a lid 24 that is hinged to a cover 32, 32A, 32B through a hinge mechanism 34. However, as an alternative to the lid 24, it is also envisioned that the reusable food pouch 10, 10A, 10B may be closed by a flexible cap that is tethered to the cover 32, 32A, 32B by a flexible strap. The flexible cap may be removably friction fitted on the spout 16 or feeding tube connector 154, 164 of the reusable food pouch 10, 10A, 10B to prevent leakage from the reusable food pouch 10, 10A, 10B while the reusable food pouch 10, 10A, 10B is not in use. The flexible cap and the flexible strap may be made of a single piece of silicone, rubber, or other flexible material. The flexible strap may be co-molded with the cover 32, 32A, 32B or may be otherwise attached to the cover 32, 32A, 32B, for example, by adhesive or a mechanical fastener.

The above description is given by way of example, and not limitation. Given the above disclosure, one skilled in the art could devise variations that are within the scope and spirit of the invention disclosed herein, including various ways of forming the lid 24. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of providing a flowable food product to a patient connected to a feeding tube, the method comprising:

providing a deformable receptacle having a cavity for holding the flowable food product, the deformable receptacle being compressible to push the flowable food product out of the cavity by compressing the deformable receptacle, the deformable receptacle having a first end and an opening at an opposed second end of the deformable receptacle;

filling the deformable receptacle with the flowable food product;

attaching a rigid cover to the second end of the deformable receptacle, the rigid cover having a male feeding tube connector that is connectable to a female feeding tube connector of a feeding tube, wherein, when the male feeding tube connector is connected to the female feeding tube connector; the deformable receptacle and the feeding tube are in fluid tight fluid communication to allow the flowable food product to be forced out of the opening of the deformable receptacle and through the feeding tube as the deformable receptacle is squeezed;

connecting the male feeding tube connector to the female feeding tube connector of the feeding tube; and squeezing the deformable receptacle to force the flowable food product out of the deformable receptacle, through a one-way valve which allows flowable food product to only flow from the deformable receptacle to the feeding tube and into the feeding tube, the flowable food product being forced out of the deformable receptacle during the squeezing step;

releasing pressure off of the deformable receptacle to stop the flowable food product from flowing out of the deformable receptacle to the feeding tube;

after the releasing step, stopping flow of the flowable food product from the feeding tube to the deformable receptacle at the one-way valve to prevent back flow of flowable food product from the feeding tube to the deformable receptacle.

2. The method of claim 1 wherein the male feeding tube connector complies with a United States Food and Drug Administration (FDA) recognized consensus standard.

3. The method of claim 1 wherein the male feeding tube connector complies with International Organization for Standardization (ISO) 80369-3.

4. The method of claim 1 further comprising disposing the one way valve between the deformable receptacle and the rigid cover so that the flowable food product does not flow out of the opening of the deformable receptacle unless sidewalls of the deformable receptacle are being compressed or suction is formed at the male feeding tube connector.

5. The method of claim 4 wherein the valve has an upper surface that has a configuration identical to an interior surface of the rigid cover.

6. The method of claim 1 further providing a non feeding tube, and the non feeding tube is not connectable to the male feeding tube connector.

* * * * *